US011591968B2

(12) United States Patent
Sheridan et al.

(10) Patent No.: US 11,591,968 B2
(45) Date of Patent: Feb. 28, 2023

(54) SYSTEM AND METHOD FOR SHIMMING A BEVEL GEAR IN AN IGB ON A GAS TURBINE WITHOUT REMOVAL OF THE BEVEL GEAR

(71) Applicant: Rolls-Royce Corporation, Indianapolis, IN (US)

(72) Inventors: Timothy David Sheridan, Zionsville, IN (US); Joseph Swift, Indianapolis, IN (US); Daniel Feinstein, Zionsville, IN (US); Caleb Camara, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 0 days.

(21) Appl. No.: 17/591,242

(22) Filed: Feb. 2, 2022

(65) Prior Publication Data

US 2022/0154650 A1    May 19, 2022

Related U.S. Application Data

(62) Division of application No. 16/557,048, filed on Aug. 30, 2019, now Pat. No. 11,274,605.

(51) Int. Cl.
*F02C 7/32*    (2006.01)

(52) U.S. Cl.
CPC ............ *F02C 7/32* (2013.01); *F05D 2220/32* (2013.01); *F05D 2230/644* (2013.01); *F05D 2240/52* (2013.01); *F05D 2240/60* (2013.01)

(58) Field of Classification Search
CPC .......... F02C 7/32; F02C 7/36; F05D 2220/32; F05D 2240/52; F05D 2240/60; F05D 2250/313; F05D 2230/644
See application file for complete search history.

(56) References Cited

U.S. PATENT DOCUMENTS 7,748,952 B1    7/2010  Schopf et al.
8,042,341 B2   10/2011  Charier et al.
(Continued)

FOREIGN PATENT DOCUMENTS

EP    1003671 B1    4/2001
EP    2 123 883 A2   11/2009
(Continued)

OTHER PUBLICATIONS

French Search Report with English Translation, dated Jun. 17, 2022, pp. 1-11, French Patent Application No. FR 2008644, French National Institute of Industrial Property, Courbevoie, France.

*Primary Examiner* — Loren C Edwards
(74) *Attorney, Agent, or Firm* — Crowell & Moring LLP

(57) ABSTRACT

A method for shimming a thrust bearing for an accessory power take off shaft to obtain optimal meshing of bevel gears within the internal gearbox (IGB) without disassembly of the IGB is enabled by relocating the thrust bearing from the engine sump. The accessory gearbox (AGB) is driven from a power off-take from the turbine spool via the IGB. The radial position of the power take-off bevel gear is established by a radial position of the thrust bearing attached to the exterior of the casing via a housing. Candidate shims are selected from a set each having different thicknesses, the shims are formed of two halves and placed between the housing and the engine casing to adjust the radial position of the thrust bearing and consequently the power take-off bevel gear, without requiring the disassembly of the IGB.

20 Claims, 5 Drawing Sheets

(56) References Cited

U.S. PATENT DOCUMENTS

2006/0248900 A1 11/2006 Suciu et al.
2009/0064683 A1 3/2009 Moniz et al.
2016/0138476 A1* 5/2016 Lemarchand ......... F01D 25/162
                            415/213.1

FOREIGN PATENT DOCUMENTS

EP   2 239 440 A1  10/2010
JP    5363512 B2  12/2013

* cited by examiner

SYSTEM AND METHOD FOR SHIMMING A BEVEL GEAR IN AN IGB ON A GAS TURBINE WITHOUT REMOVAL OF THE BEVEL GEAR

CROSS REFERENCE TO RELATED APPLICATIONS

This application is a divisional application of, and claims priority under 35 USC § 120 to U.S. nonprovisional application Ser. No. 16/557,048, filed Aug. 30, 2019, the entire contents of which are incorporated by reference.

BACKGROUND

In gas turbine engine applications, torque is transmitted from the turbine spool, typically the high pressure spool, to drive engine accessories, such as generators, hydraulic and oil pumps, etc. The torque is typically transferred to a shaft perpendicular to the main axis of the turbine spool. This orthogonal diversion of torque is achieved via a set of bevel gears in the Internal Gear Box (IGB). The IGB includes a main axis bevel gear interacting with the accessory bevel gear, the accessory bevel gear connected to the accessory shaft which in turn transfers the torque from the IGB to an Accessory Gear Box (AGB).

FIG. 1 illustrates a conventional arrangement within the IGB. The main axis bevel gear 103 rotates about the main axis 101 of the turbine spool, in this case a high pressure spool (not shown), alternatively the low pressure spool (also not shown) may be used. The accessory bevel gear 105 meshes (cooperates) with the main axis bevel gear 103 to transfer torque through the accessory torque transfer shaft 111. The transfer shaft 111 typically engages a spline within the AGB (not shown). The transfer shaft 111 is typically orthogonal to the main axis.

In order to achieve the optimal mesh between the teeth of the main axis bevel gear 103 and the accessory bevel gear 105, the radial position of the accessory bevel gear 105 is adjusted with the use of shims. As shown in FIG. 1, the shims 109 are assembled adjacent and below to the gear's thrust bearing 107 as it is the thrust bearing 107 that dictates radial position. The shims 109 change the radial position of the thrust bearing 107 and thus the accessory bevel gear 105 with respect to the main axis bevel gear 103 by defining the radial distance between an inter surface of the casing 113 and the radially outer seat of the thrust bearing 107. The use of axial and radial within the context of this disclosure is with reference to the turbine spool, axially being parallel to the main axis and radially being orthogonal thereto.

Conventionally, the thrust bearing 107 is placed in the sump area close to the accessory bevel gear 105 within the IGB. This favorable position also unloads the torque transfer shaft 111 via the thrust bearing 107 of compressive and lateral forces and thus facilitates the use of a smaller and/or lighter shaft, as the sizing of the shaft 111 becomes predominately a function of torque. Consequently, because of this location within the engine sump, assemblers must repeatedly insert and remove the bevel gears 103, 105, transfer shaft 111 and the thrust bearing 107 from the forward casing 113 during the shimming process until the desired bevel gear mesh tooth patterns and optimum backlash is achieved. This assembly and disassembly may add a half a day to a day to the engine assembly process, which is also attendant with an increase in costs and heightened risk of collateral damage to the engine parts.

Thus there is a need in the art for a system and method in which the repeated assembly and disassembly is reduced or eliminated in the positioning of the accessory bevel gear. The disclosed subject matter introduces a system and method in which the shimming process may be accomplished from the exterior of the casing, thus eliminating the repeated assembly and disassembly of the bevel gears. The disclosed subject matter also introduces the use of a split shim, such that the shims may be installed with only minor disassembly of casing external components.

SUMMARY

According to some aspects of the present disclosure, a system for driving an accessory gearbox associated with a gas turbine engine, may include a turbine spool defining a main axis; an engine casing defining an interior volume. The accessory gearbox may be external to the engine casing. Embodiments include an accessory torque transfer shaft, which may define a shaft axis anti-parallel to the main axis and an internal gearbox within the casing. The internal gearbox may contain a bevel gear connected to the turbine spool and a cooperating bevel gear connected to the accessory torque transfer shaft. Embodiments may include a thrust bearing connected to the accessory shaft at a predetermined position along the shaft axis; a flange assembly connected to the thrust bearing. Thrust may be transferred from the torque transfer shaft to the thrust bearing and to the flange assembly. Embodiments include a shim positioned between an exterior surface of the engine casing and the flange assembly (or housing). The thickness of the shim may establish the radial positioning of the thrust bearing with respect to the casing.

In some embodiments, the shaft axis is perpendicular to the main axis and the flange assembly connects the accessory gearbox to the engine casing. The system may further include a second bearing located on the torque transfer shaft between the corresponding bevel gear and the thrust bearing, the second bearing transferring axial force from the torque transfer shaft to the casing. The casing further defines a radial passage between the interior volume and the exterior of the engine casing, the radial passage having an internal diameter greater than a diameter of the accessory torque transfer shaft and less than the largest diameter of the flange assembly. Shims may be formed of two halves. In some embodiments, the two halves are asymmetric with respect to each other. In some embodiments, each of the halves have a plurality of holes, the plurality of holes forming a pattern unique to each respective half. The system may further include a plurality of shims, each of the plurality of shims having a thickness at least different from another of the plurality of shims.

Other aspects of the present disclosure include a method for the radial positioning of a power take-off bevel gear with respect to a bevel gear associated with a turbine. The method may include positioning the power take-off bevel gear within an interior of an engine casing, extending the transfer shaft associated with the power take-off bevel gear between the bevel gear and the exterior of the casing; attaching a thrust bearing to a flange assembly and from the exterior of the casing sliding the thrust bearing and flange assembly over the transfer shaft in the radially inward direction. The method further includes placing two halves of a shim plate around the flange assembly between a radially inward facing surface of the flange assembly and a radially outward facing exterior surface of the casing; applying a radial force to the flange assembly to thereby engage the flange with the shim plate and the shim plate with the exterior surface to the casing. The method also includes determining a radial position of the take-off bevel with respect to the turbine bevel; placing two halves of another shim around the flange assembly and between the radially inward facing surface of the flange assembly and the radially outward facing exterior surface of the casing to change the radial position of the take-off bevel. The thrust bearing may engage the transfer shaft at a predetermined location along the transfer shaft.

In some embodiments, the step of extending the transfer shaft includes extending the transfer shaft through a second bearing located in the interior of the casing. The second bearing transfers axial loads from the transfer shaft to the casing. In some embodiments, the step of placing two halves of another shim may further include selecting a shim plate from a plurality of shim plates, the selection being a function of at least the determined position of the power take-off bevel gear. The step of placing two halves of another shim may further comprise removing the two halves of the shim plate or may include placing the two halves of the another shim on top of the two halves of the shim already in place.

Some aspects of the present disclosure include a method of adjusting the radial position of the take-off bevel gear with respect to the driving bevel gear from a first position to a second position without out removing the take-off bevel gear or the transfer shaft from their engaged position. The method may include selecting a candidate shim from a plurality of shims having different thicknesses; placing the candidate shim radially between a portion of the housing and the casing; advancing the thrust bearing and housing over the transfer shaft; wherein the adjustment of the radial position is a function of the candidate shim thickness.

In some embodiments, the housing is a portion of the accessory gearbox. In some embodiments, the step of placing the candidate shim radially between a portion of the housing and the casing, further comprises placing two halves of the candidate shim between the portion of the housing and the casing, and wherein the housing is not removed from the transfer shaft during the placement of the two halves. The radial position of the take-off bevel gear may be further adjusted by selecting a second candidate shim from the plurality of shims and placing the second candidate shim between the housing and the casing.

BRIEF DESCRIPTION OF THE DRAWINGS

The following will be apparent from elements of the figures, which are provided for illustrative purposes.

Figure 1:
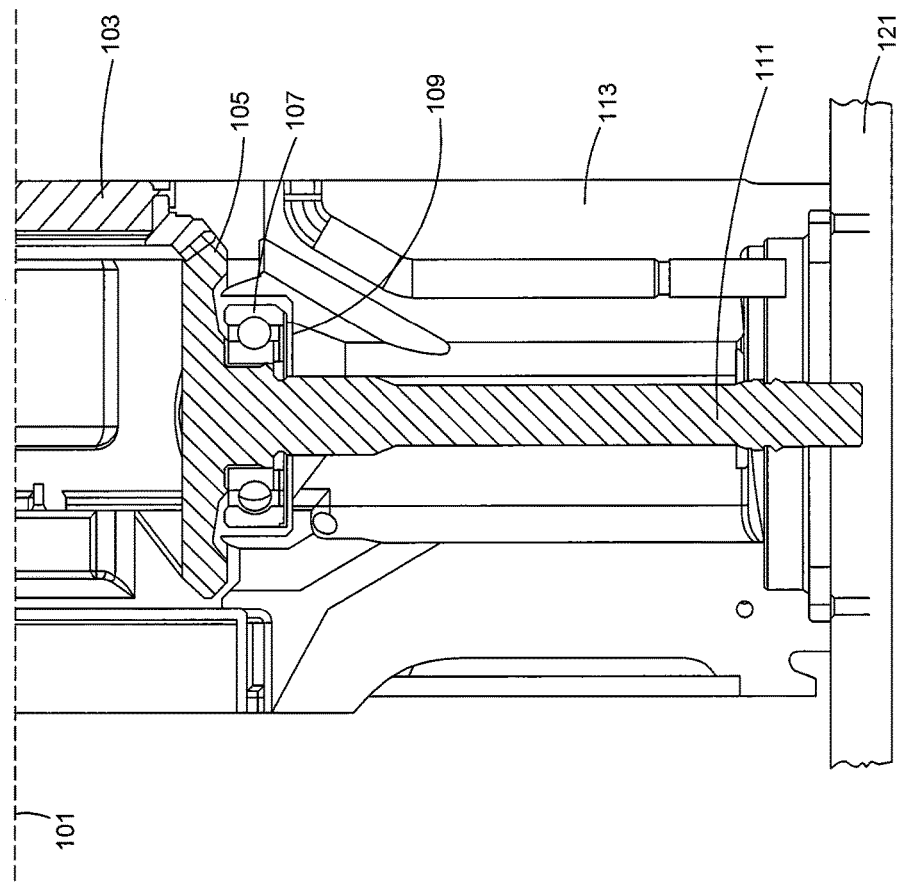
FIG. 1 is an illustration of a prior art system for positioning the accessory bevel gear.

The present application discloses illustrative (i.e., example) embodiments. The claimed inventions are not limited to the illustrative embodiments. Therefore, many implementations of the claims will be different from the illustrative embodiments. Various modifications may be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

Figure 2:
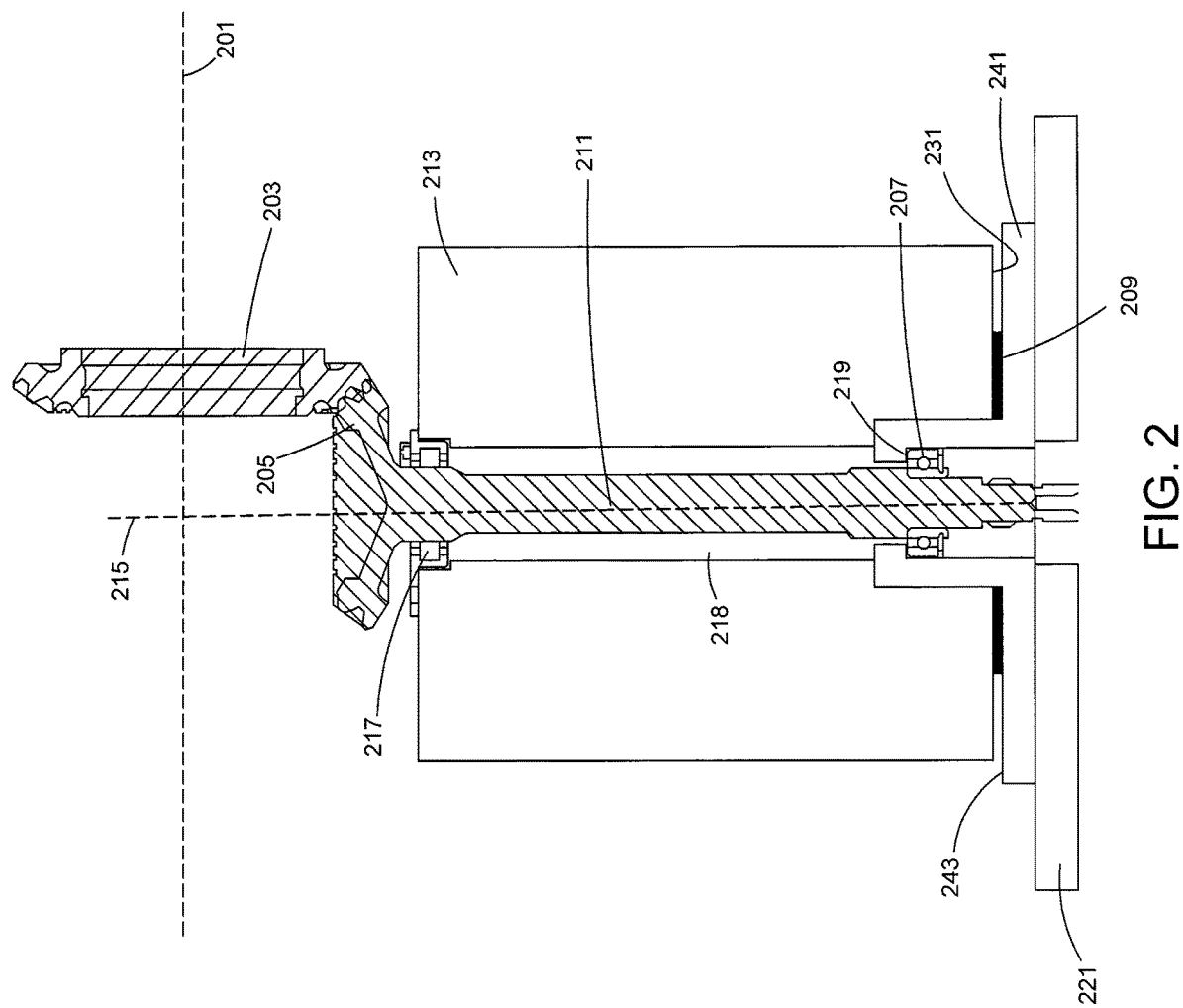
FIG. 2 is an illustration of a bevel gear system according to embodiments of the disclosed subject matter.

FIG. 2 discloses an arrangement of the bevel gears and thrust bearing 207 which eliminates the requirement to disassemble the gears in the shimming process according to an embodiment of the disclosed subject matter.

In the embodiment shown in FIG. 2, the radial position of the accessory bevel gear 205 is adjusted with the use of shims 209. As shown in FIG. 2, the shims 209 are assembled adjacent and below to the gear's thrust bearing 207. The thrust bearing 207 dictates radial position of the accessory bevel gear 205 as noted previously. Unlike the conventional arrangements, the shims 209 change the radial position of the thrust bearing 207 and thus the accessory bevel gear 205 with respect to the main axis bevel gear 203 by defining the radial distance between an outer surface 231 of the casing 213 and a radially inward facing surface 243 of housing 241. The housing 241 seats the thrust bearing 207. The AGB 221 is attached to the casing 213 by or via housing 241.

In FIG. 2, the thrust bearing 207 is not located in the sump area with the accessory bevel 205 but rather at the opposite end proximate to the exterior of the casing 213. This relocation to the bottom or radially offset position with respect to the accessory bevel gear 205 and transfer shaft 211, places the thrust bearing 207 near the engine-accessory gearbox (AGB) split-line. This location requires addressing the additional load carried by the accessory transfer shaft 211, specifically with respect to axial loading along the shaft axis 215 due to the thrust loading. Although moving the location of the thrust bearing away from the mesh, gives less control of the gear patterns. Design mitigations such as material selection, shaft length, power take-off load can be made to minimize such concern. A bearing 217 is also shown in FIG. 2, similarly situated as in the prior art, however bearing 217 is not a thrust bearing and only transfers axial forces transverse to the transfer shaft from the shaft 211 to the casing 213. Additional non-thrust bearings may also be incorporated elsewhere on the transfer shaft 211 as needed, for example to mitigate overload of the transfer shaft 211.

Figure 3:
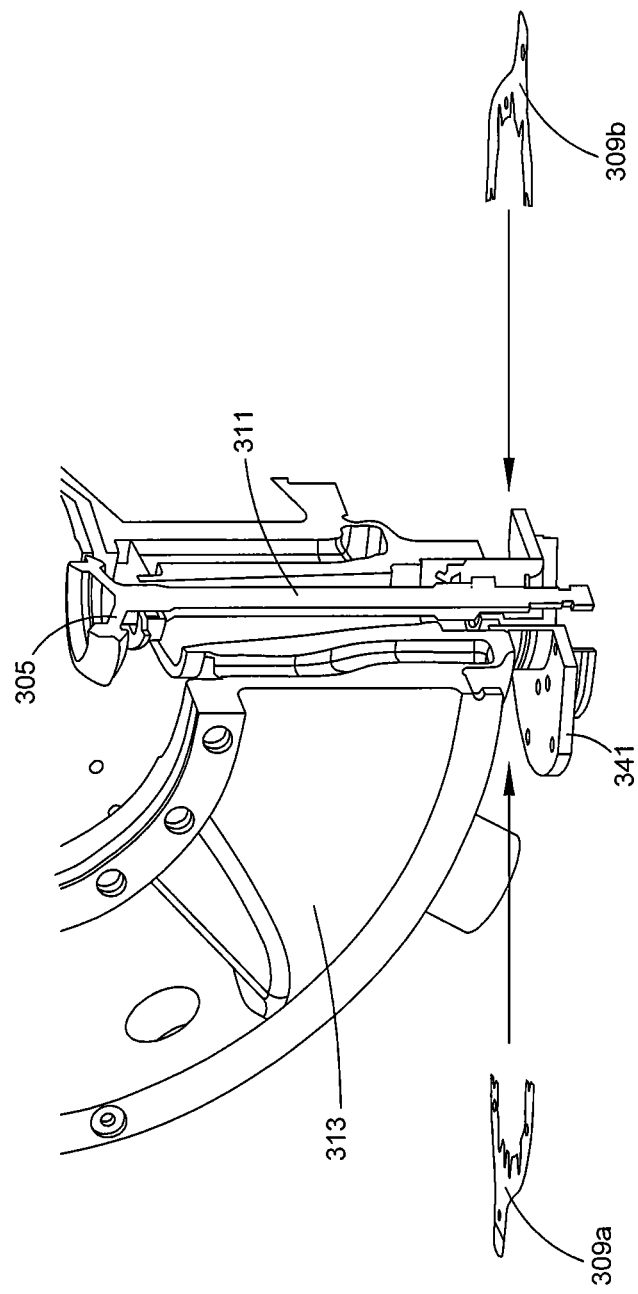
FIG. 3 is a partial exploded view of the bevel gear assembly and shims according to embodiments of the disclosed subject matter.

Advantageously, because of the location outside of the sump, assemblers need not remove the accessory bevel gear 205 in order to adjust the radial position by adding or changing shims 209. Instead, while leaving the elements of the IGB in place (i.e. main axis bevel gear 203 and accessory bevel gear 205) the shims 209 may be placed between the casing 213 and the housing 241 (flange assembly) with access being external to the casing. Furthermore, with the split configuration of the shims 209 (described in more detail in FIG. 4 below), the housing 241 need not be entirely removed from the casing 213, but only slid radially outward to create a separation between the casing the inner face surface 243 enough to remove a shim or insert a different shim. FIG. 3 discussed below further illustrates this embodiment.

The thrust bearing 207 attaches to the transfer shaft 211 at a predetermined location along the axis 215, as shown in FIG. 2 a ridge or flare 219 is provided on the transfer shaft to seat the top of the thrust bearing 207 to the transfer shaft 211. The casing 213 defines a radial passage 218 between the interior in which the sump and IGB are located and the exterior of the casing 213, the radial passage 218 has an internal diameter of sufficient size to accommodate the transfer shaft 211, with the internal diameter be constricted to allow the positioning of the shims 209 between the casing 213 (i.e. less than the diameter of the housing 241 which remains external to the casing 213.

With the thrust bearing 207 relocated to the bottom of the transfer shaft 211, the shim 209 location is no longer buried within the sump and is readily accessible reducing the time and expense of disassembly and assembly of the conventional method.

In FIG. 2, the transfer shaft axis 215 is shown perpendicular to the main axis 201; however, other orientations (i.e. oblique angles) are also envisioned.

FIG. 3 illustrates an embodiment in which the shim 309 is formed in halves 309a and 309b, and thus allows the insertion and/or removal without disassembling the bevel gears or entirely removing the housing 341. By slightly siding the housing 341 radially outward (downward) over the transfer shaft 311, the halves of the shim 309 may be inserted between the flange of the housing 341 and the exterior surface of the casing 313. The housing 341 may then be slid radially inward (upward) and secured to the casing 313.

This arrangement along with the two-piece shim 309 eliminates the need to repeatedly remove and replace the bevel gear 305 during engine assembly.

Figure 4B:
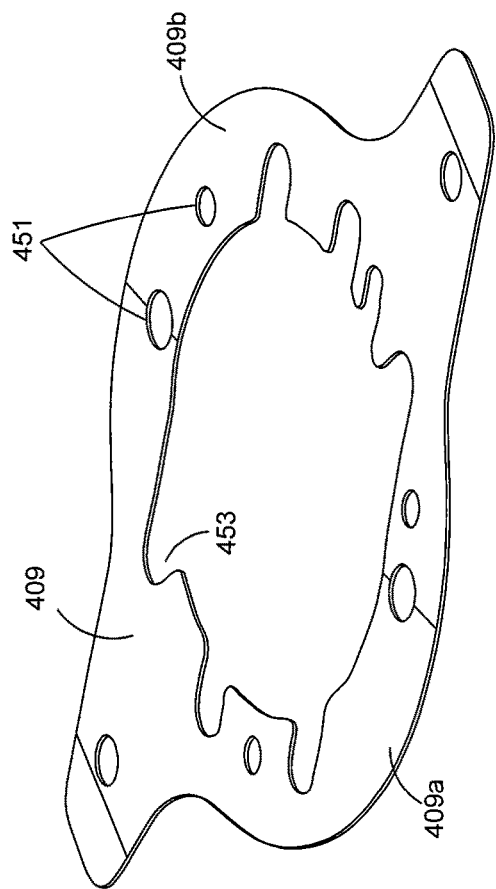
FIGS. 4A and 4B are isolated illustrations of the shims according to embodiments of the disclosed subject matter.
Figure 4A:
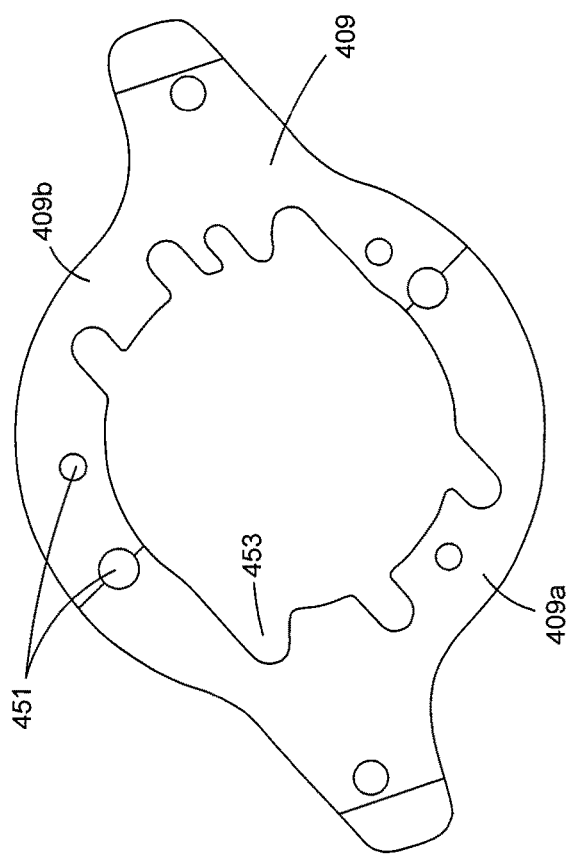

FIG. 4 is an illustration of the split shims according to an embodiment of the disclosed subject matter. The shims 409 each have a plurality of holes 451 and grooves 453, which correspond the bolts used to attach the housing 341 and/or the AGB to the casing 313. The layout of the holes 451 and grooves 453, as well as the perimeter of the shim 409 is preferable asymmetric and/or irregular (i.e. each of the halves have holes and groove that form a unique pattern) such that the each of the shim halves 409a and 409b will only fit in one position (i.e. 409a will not fit on the side designated for shim half 409b, nor will either fit if inserted upside down.) Each of the halves 409a and 409b have the same predetermined thickness, which may be stamped or otherwise indicated on the shim 409. Additionally, each turbine engine during assembly may be provided with a set having a plurality of shims of different thicknesses. The assembler may run through several candidate shims until the proper radial positioning of the accessory bevel gear 305 is met. Multiple shims may be stacked to obtain the desired positioning or the selection of a single shim of proper thickness may be required. While FIGS. 4A and 4B illustrate the shim 409 divided into two halves 409a and 409b, additional divisions are equally envisioned, for example where access to the housing 341 is limited to a width less than the width of the shim 409, in which case the shim 409 may be made of thirds, each having a width that allows access to the housing 341.

Figure 5:
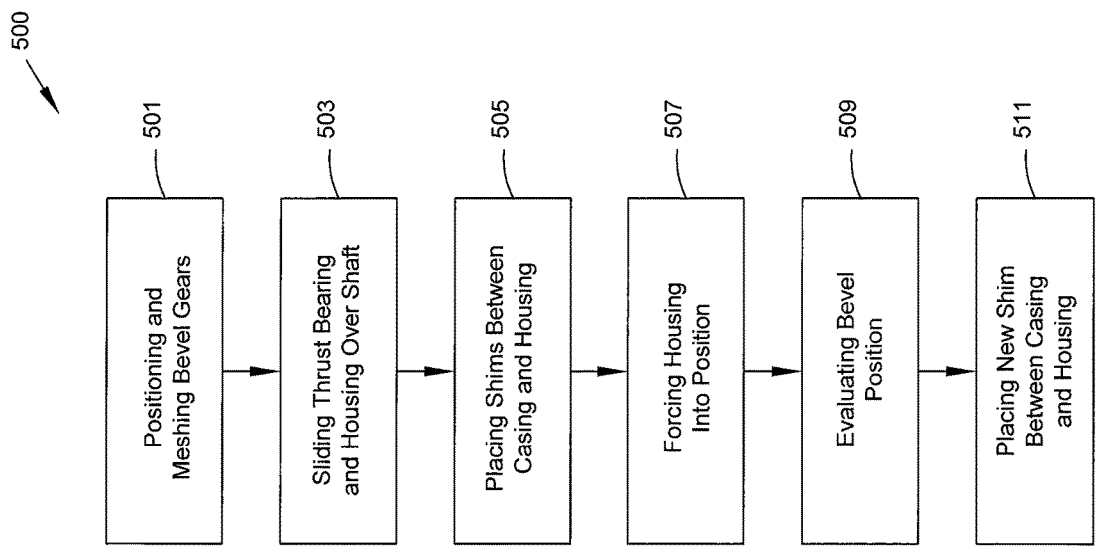
FIG. 5 is a flow chart of the shimming process according to embodiments of the disclosed subject matter.

FIG. 5 is an illustrative flow chart 500 of the shimming process according to embodiments of the disclosed subject matter. Reference of the components are with respect to FIG. 2. The power take-off bevel gear 205 is positioned and meshed with the main axis bevel gear 203 within the interior of an engine casing 213 as shown in Block 501. With the power take-off bevel gear 205 in position, the transfer shaft 211 associated with the power take-off bevel extends between the bevel gear 205 and the exterior of the casing 213. The transfer shaft 211 may also extend through a second bearing (non-thrust bearing) 217 located in the interior of the casing 213. This second bearing 217 allows relative axial movement along the shaft axis 215 between the bearing 217 and the transfer shaft 211 and only reacts lateral forces (i.e. forces perpendicular to the shaft axis 215).

The thrust bearing 207 is attached to a housing 241 (flange assembly) and from the exterior of the casing 213, the housing 241 and attached thrust bearing 207 are slid over the transfer shaft 211 in the radially inward direction as shown in Block 503.

The two halves of a shim 209 are placed around the housing 241 between a radially inward facing surface 243 of the housing 241 and a radially outward facing exterior surface of the casing 213 as shown in Block 505. Alternatively, if a split shim is not used, the shim 209 may be placed over the housing 241 prior to placing the housing 241 over the transfer shaft 211, in which case any subsequent change of shims would likewise require the housing 241 to be removed. In either alternative, the housing 241 is forced into place engaging the housing 241 with the shim 209 and the shim 209 with the exterior surface to the casing 213 as shown in Block 507.

The radial position of the power take-off bevel 205 with respect to the turbine spool bevel 203 is evaluated to ensure the proper operation of the IGB as shown in Block 509. If the position is required to be changed, the housing is slid radially outward from the casing to allow the placement of two halves of a new shim around the housing 241 between the radially inward facing surface 243 of the housing 241 and the radially outward facing exterior surface of the casing, as shown in Block 511. The old shim may be removed prior to placing the new shim, or the new shim may be stacked upon the old shim. Typically, depending on the amount of change required from the old position, an assembler will select a candidate shim from a set provided with the turbine, which will result in the proper positioning, rather than stacking shims. The housing again is forced into place engaging the housing 241 with the shim 209 and the shim 209 with the exterior surface to the casing 213 and resulting in the proper radial positioning of the power take-off bevel 203. The thrust bearing engages the transfer shaft at the predetermined location 219 along the transfer shaft 211 to transfer the thrust load to the casing 213. The process may be repeated as needed to achieve optimal mesh.

Although examples are illustrated and described herein, embodiments are nevertheless not limited to the details shown, since various modifications and structural changes may be made therein by those of ordinary skill within the scope and range of equivalents of the claims.

What is claimed is:

1. A method for a radial positioning of a power take-off bevel gear with respect to a turbine spool bevel gear associated with a turbine spool, the method comprising:

positioning the power take-off bevel gear within an interior of a casing, extending a transfer shaft associated with the power take-off bevel gear between the turbine spool bevel gear and an exterior of the casing;

attaching a thrust bearing to a flange assembly, sliding the thrust bearing and the flange assembly from the exterior of the casing over the transfer shaft in a radially inward direction;

placing a shim plate between a radially inward facing surface of the flange assembly and a radially outward facing exterior surface of the casing to change a radial position of the power take-off bevel gear;

applying a radial force to the flange assembly to thereby engage the flange assembly with the shim plate and the shim plate with the exterior surface of the casing to change the radial position of the power take-off bevel gear; and determining the radial position of the power take-off bevel gear with respect to the turbine spool bevel gear;

wherein the thrust bearing engages the transfer shaft at a predetermined location along the transfer shaft, wherein the flange assembly is disposed between and directly contacts a radially outer wall of the thrust bearing and the casing.

2. The method of claim 1, wherein the step of extending the transfer shaft further comprises extending the transfer shaft through a second bearing located in the interior of the casing.

3. The method of claim 2, wherein the second bearing transfers lateral loads from the transfer shaft to the casing.

4. The method of claim 1 wherein the shim plate is a first shim plate, the method further comprises placing a second shim plate between the radially inward facing surface of the flange assembly and the radially outward racing exterior surface of the casing.

5. The method of claim 4, wherein the placing the second shim plate further comprises:
selecting a candidate shim plate from a plurality of shim plates, the selection being a function of at least the determined radial position of the power take-off bevel gear.

6. The method of claim 4, wherein the step of placing the second shim plate further comprises removing the first shim plate.

7. The method of claim 4, wherein the placing the second shim plate comprises placing the second shim plate on top of the first shim plate.

8. The method of claim 4 wherein the first shim plate and the second shim plate each comprise two halves.

9. A method of adjusting a radial position of a power take-off bevel gear in a gas turbine engine, the power take-off bevel gear coupled to an accessory gearbox, the radial position adjusted with respect to a driving bevel gear coupled to a turbine spool in the gas turbine engine from a first position to a second position without removing the power take-off bevel gear or a transfer shaft from their respective engaged positions, wherein the accessory gear box is driven from a power off-take from the turbine spool via an internal gear box, the internal gear box engaging the driving bevel gear coupled to the turbine spool with the power take-off bevel gear coupled to the accessory gear box via the transfer shaft, wherein the radial position of the power take-off bevel gear is established by a radial position of a thrust bearing attached to an exterior of a casing of the gas turbine engine via a housing, the method comprising:
selecting a candidate shim from a plurality of shims having different thicknesses;
placing the candidate shim radially between a portion of the housing and the casing;
advancing the thrust bearing and the housing over the transfer shaft and securing the housing to the casing, wherein the adjustment of the radial position of the power take-off bevel gear is a function of a thickness of the candidate shim, wherein the housing is disposed between and directly contacts a radially outer wall of the thrust bearing and the casing.

10. The method of claim 9, wherein the housing is a portion of the accessory gear box.

11. The method of claim 9, wherein the placing the candidate shim radially between the portion of the housing and the casing further comprises placing two halves of the candidate shim between the portion of the housing and the casing, and wherein the housing is not removed from the transfer shaft during placement of the two halves.

12. The method of claim 9, wherein the radial position of the power take-off bevel gear is further adjusted by selecting a second candidate shim from the plurality of shims having different thicknesses and placing the second candidate shim between the housing and the casing.

13. A method for a radial positioning of a power take-off bevel gear within an internal gear box with respect to a turbine spool bevel gear associated with a turbine spool, the method comprising:
positioning the power take-off bevel gear within an interior of a casing, the casing defining an engine sump and the internal gear box disposed within the casing;
extending a transfer shaft associated with the power take-off bevel gear between the turbine spool bevel gear and an exterior of the casing;
attaching a thrust bearing to a flange assembly, from the exterior of the casing by sliding the thrust bearing and the flange assembly over the transfer shaft in a radially inward direction;
placing two halves of a shim plate around the flange assembly between a radially inward facing surface of the flange assembly and a radially outward facing exterior surface of the casing to change a radial position of the thrust bearing with respect to the casing;
applying a radial force to the flange assembly to thereby engage the flange assembly with the shim plate and the shim plate with the exterior surface of the casing; and
determining a radial position of the power take-off bevel gear with respect to the turbine spool bevel gear;
wherein the thrust bearing engages the transfer shaft at a predetermined location along the transfer shaft, wherein the two halves are asymmetric with respect to each other.

14. The method of claim 13, wherein the turbine spool defines a main axis and the transfer shaft defines a shaft axis, wherein the shaft axis is perpendicular to the main axis.

15. The method of claim 13, further comprising connecting the casing to an accessory gear box via the flange assembly.

16. The method of claim 13, further comprising locating a second bearing on the transfer shaft between the power take-off bevel gear and the thrust bearing, the second bearing configured to transfer lateral forces from the transfer shaft to the casing.

17. The method of claim 13, wherein the casing defines a radial passage between the engine sump and the exterior of the casing, the radial passage having an internal diameter greater than a diameter of the transfer shaft and less than a largest diameter of the flange assembly.

18. The method of claim 13, wherein the shim plate is a first shim plate, the method further comprising placing a second shim plate around the flange assembly and between the radially inward facing surface of the flange assembly and the radially outward facing exterior surface of the casing.

19. The method of claim 18, wherein the first shim plate and the second shim plate have different thicknesses.

20. The method of claim 13, wherein the each of the two halves have a plurality of holes forming a pattern unique to each respective half.

* * * * *